Figure 1:
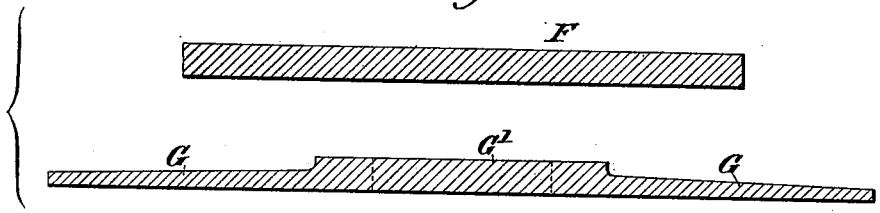

No. 630,607. Patented Aug. 8, 1899.
W. E. HILL.
HEADED CYLINDER.
(Application filed May 21, 1898.)
(No Model.) 2 Sheets—Sheet 1.

Witnesses:
Raphaël Netter
James M. Batlow

Warren E. Hill, Inventor
by Robt. F. Gaylord, Atty.

No. 630,607. Patented Aug. 8, 1899.
W. E. HILL.
HEADED CYLINDER.
(Application filed May 21, 1898.)

(No Model.) 2 Sheets—Sheet 2.

Witnesses: Warren E. Hill, Inventor
Raphaël Netter
James D. Catlow by Robt. F. Gaylord, Atty.

THE NORRIS PETERS CO., PHOTO-LITHO., WASHINGTON, D. C.

UNITED STATES PATENT OFFICE.

WARREN E. HILL, OF NEW YORK, N. Y.

HEADED CYLINDER.

SPECIFICATION forming part of Letters Patent No. 630,607, dated August 8, 1899.

Application filed May 21, 1898. Serial No. 681,365. (No model.)

*To all whom it may concern:*

Be it known that I, WARREN E. HILL, a resident of the city of New York, borough of Brooklyn, county of Kings, and State of New York, have invented certain new and useful Improvements in Headed Cylinders, of which the following is a specification, reference being had to the accompanying drawings.

The present article of manufacture and the method of producing the same relate to the art shown by my United States Letters Patent No. 414,643, dated November 5, 1889, which art comprises manufacturing a cylindrical structure (to be used as a steam boiler, shell, or drum, boiler-flue, or as a receptacle for use to withstand high pressure) provided with a head or heads having formed therefrom cylindrical flanges which are welded to the end edges of the cylindrical structure. In the said patent is illustrated and described a cylinder and a head (for the cylinder) having formed therefrom cylindrical flanges which are welded to the cylinder, which head has an opening through the same of diameter nearly that of the cylinder, whereas the present invention relates to a cylindrical body having a head (provided with cylindrically-formed edges formed and attached to the body as set forth in said patent) adapted to practically close the end of the cylindrical body. In manufacturing such a cylinder with a closing head it is necessary to provide for applying and operating suitable mechanism within the cylinder to assist in effecting welding of the cylindrical flange of the head to the end of the cylindrical body for the purpose of attaching connecting-pipes, for repairs, or for the purpose of cleaning the cylinder, &c. Accordingly I make the head of such a closed cylinder with an opening through the same, (which serves to permit introduction of welding or other mechanism within the cylinder and as a manhole,) which opening is to be normally closed by a bonnet, cap, or like device. In order to properly secure to the head a device certainly closing the opening through the head, it is necessary, in view of the conditions of high pressure attending the use of such a closed cylinder, and especially to prevent leakage, to make the flange surrounding the opening through the head integral with the other walls of the head and of greater thickness for the purpose of providing an effective and non-leaking anchorage for bolts or other devices engaging such flange and a closing bonnet or cap.

The invention consists of a headed plate-metal cylinder or cylindrical receptacle the head of which has edges cylindrically shaped therefrom and welded to the end of the cylinder, said head having a passage through the same the walls of which are integral with and thicker than the other walls of the head, and of the method of producing such a headed cylinder by making a plate-metal cylinder, then working a plate-metal blank or blanks to produce a head for such cylinder, and so that portions of said blank designed to become walls of a passage through the head are integral with and thicker than the other portions of the blank, and cylindrically shaping the edges of such blank and welding the same to the end edges of the said cylinder.

Figure 2:
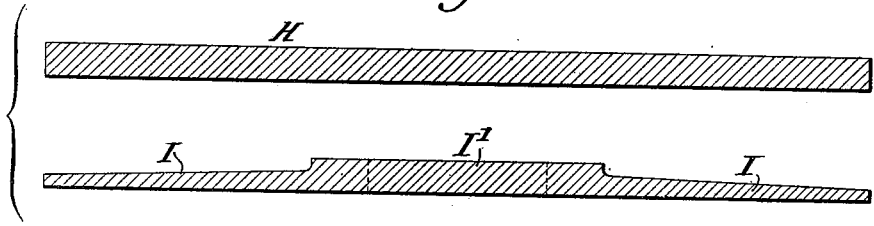
Figure 3:
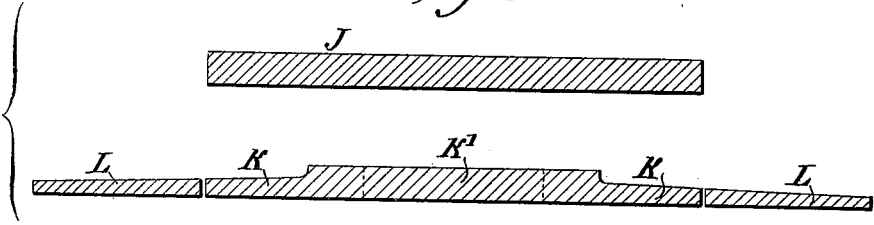
Figure 4:
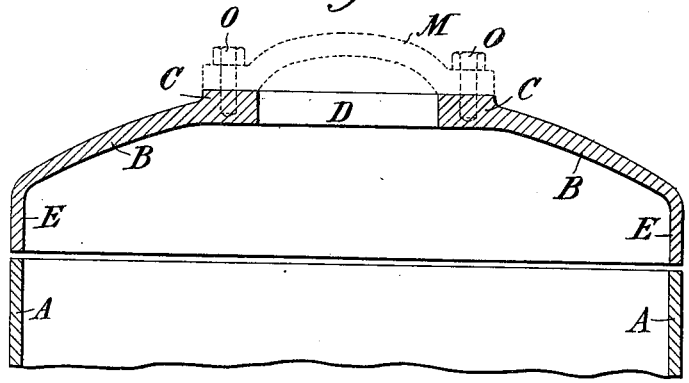
Figure 5:
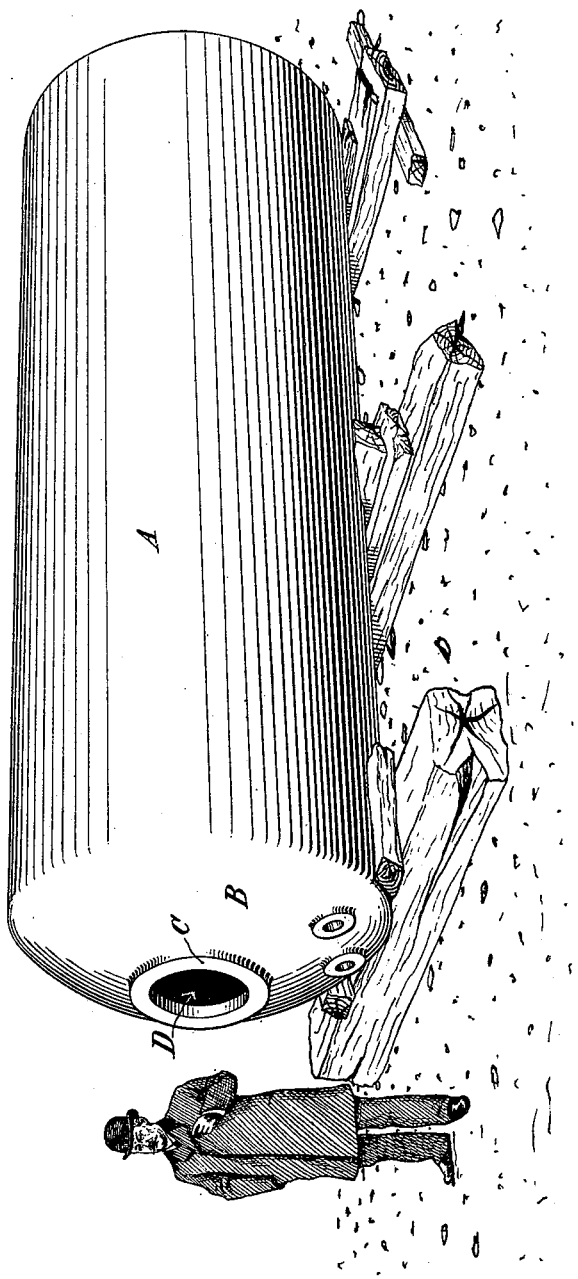

Figure 1 represents a cross-section of a circular plate-metal blank and the cross-section of a head-blank for a cylinder. Figs. 2 and 3 represent other plate blanks and corresponding head-blanks shaped therefrom. Fig. 4 represents a cross-section of a final form of head and the end of a cylinder to which the same is to be attached. Fig. 5 represents a common form of closed cylinder or cylindrical structure made in accordance with my method, this view being in accurate reduction from one of many actual structures, the length of the structure being twenty-six feet, diameter seven feet, thickness of walls nine-sixteenths of an inch, and tested pressure one hundred and ninety pounds to the square inch.

Referring to the drawings in detail, A represents the body part of the cylindrical structure. B represents the head of the same, and C the thickened and integral walls surrounding an opening D through the head, E being the cylindrically-formed flanges of the head. Such a head may be formed in various ways. In Fig. 1 is shown a circular plate-metal blank F, which by forging or any other suitable process is brought to a head-blank form having the thinned and expanded edges G. A head-blank, however, may be formed from the plate-blank H of Fig. 2 of greater diameter than the corresponding blank F of Fig. 1, and its thinned edges I may be produced by turning, milling, or by other action of cutting away the substance of the blank H. In Fig. 3 is shown a blank J, which may be operated on in any suitable way to have thinned flanges K, and to such flanges may be welded the annular plate-ring L, of one piece or of several pieces welded together. In each of these cases a portion of the original blank, as G', I', or K', is left without reduction as to thickness, which portion is designed to become the walls of a hole to be formed through the ultimate blank-head. Howsoever (by the above-suggested steps or the equivalent otherwise) the head-blank of a cylinder be formed its ultimate outline is practically that shown by B C D E of Fig. 4, where such a head-blank is shown as finally formed, having its edges cylindrically shaped to the size of the cylindrical body to which it is to be attached preliminarily to its said edges being welded to the body to form the article shown in Fig. 5. In welding this head to the cylinder-body proper welding mechanism can be inserted through the head-opening D for the purpose of operating upon the inner faces of the head edges and of the edges of the cylinder-body. Also, this opening gives access to the cylinder for the purpose of attaching connecting-pipes, as also for the purpose of cleaning the cylinder, and generally for the purpose of such access to the cylinder-body as may be necessary.

M, Fig. 4, dotted lines, represents a bonnet, closing-plate, or similar device adapted to close the opening D through the head or other device adapted to communicate with such opening. This bonnet is held to the head by bolts O, which are threaded in the thickened walls C of the head, such walls being of thickness such that the holes cut for the bolts will afford sufficient anchorage for the bolts without producing leakage around the same or reducing the pressure-retaining strength of such walls relative to the strength of the other walls of the structure. In lieu of the said bolts O other similarly-acting securing or anchoring devices may be employed.

I am aware that various plans have been suggested of reinforcing the walls of a passage in the head of a cylinder of this class of article; but no plan known to me produces separately from a cylinder-body and adapted to be attached to such a body a head having cylindrical edges formed therefrom and having walls surrounding an opening through the same which are integral with and thicker than the walls of the head, nor does any such plan include a method of producing a cylinder-head blank having the walls of a passage through the same integral with the other walls of the head and of greater thickness and cylindrically shaping the edge of the head-blank, as described of my herein set forth article and its method of production.

What is claimed as new is—

As a new article of manufacture, the plate-metal cylindrical structure, having a cylindrical body portion, and a head portion, such head portion having a cylindrical part of substantially the same diameter, and thickness of metal, as the main body portion, and a part of the head or end of greater thickness of metal than its said cylindrical part, the said thickened part being perforated, and the cylindrical part of the head portion being welded to the end of the cylindrical body portion, whereby the completed article has its head and body portions integral, and the line of welding is at some distance from the end of the structure toward its center.

WARREN E. HILL.

Witnesses:
ROBT. F. GAYLORD,
JAMES N. CATLOW.